June 25, 1957  W. D. KLEPPINGER  2,796,843
CERAMIC WELDING RING
Filed Jan. 25, 1956  2 Sheets-Sheet 1
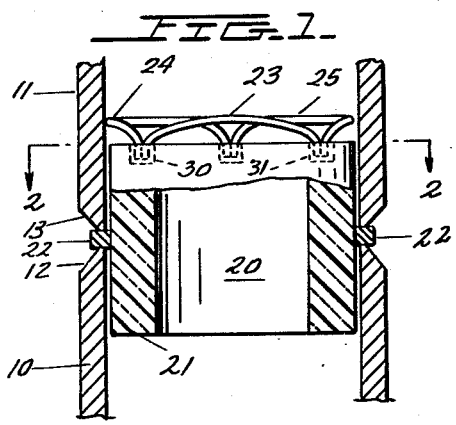
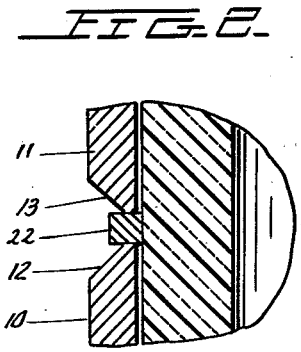
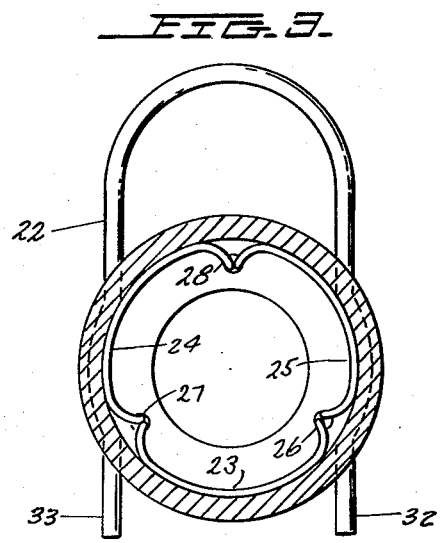
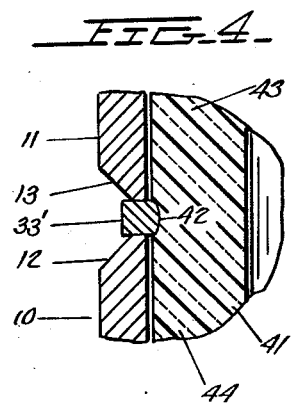
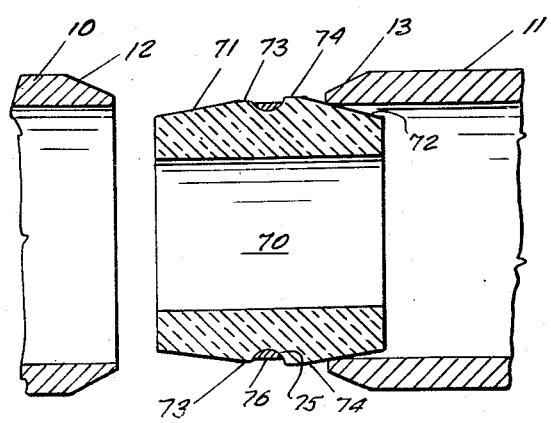
INVENTOR.
WILLIS D. KLEPPINGER
BY
Greene, Pineles &
Durr
ATTORNEYS June 25, 1957 W. D. KLEPPINGER 2,796,843
CERAMIC WELDING RING
Filed Jan. 25, 1956 2 Sheets-Sheet 2
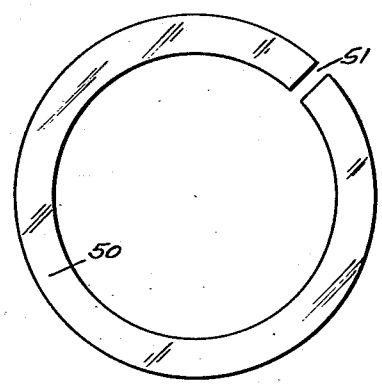
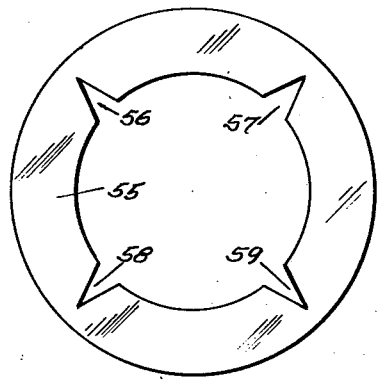
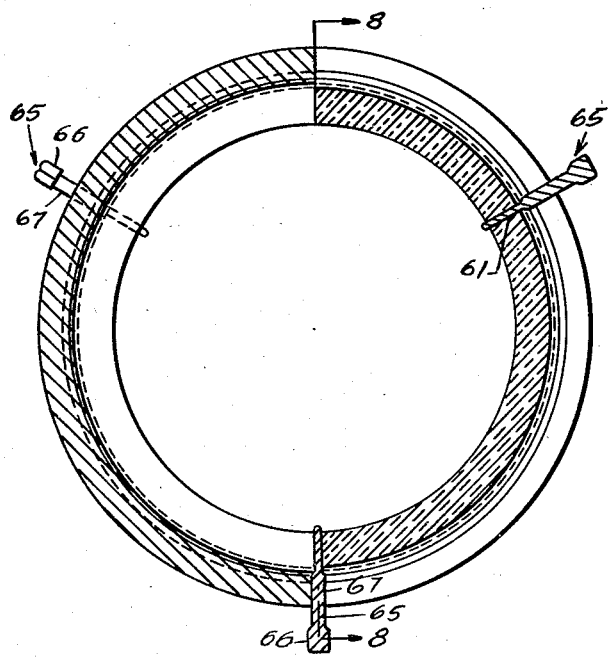
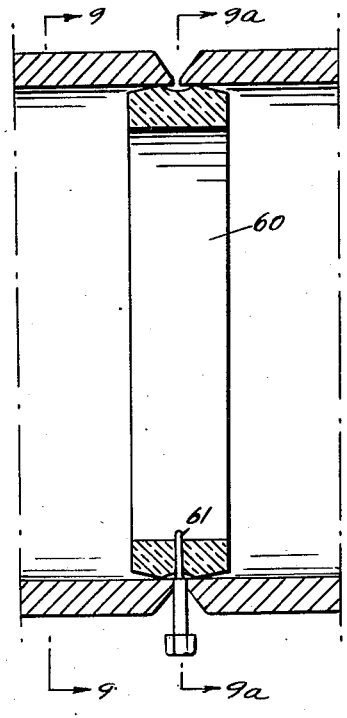
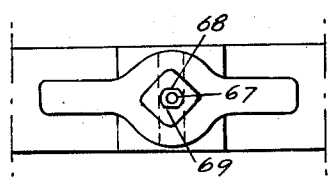
INVENTOR.
WILLIS D. KLEPPINGER
BY
Greene, Pinckes & Durr
ATTORNEYS

United States Patent Office 2,796,843
Patented June 25, 1957

2,796,843
CERAMIC WELDING RING

Willis D. Kleppinger, Plainfield, N. J., assignor to Steatite Research Corporation, Keasbey, N. J., a corporation of Delaware Application January 25, 1956, Serial No. 561,335

2 Claims. (Cl. 113—111)

This invention relates to an improved type of ceramic backing ring for the welding of the ends of pipe sections.

In welding two metal pipe sections together it has generally been the practice to insert metal backing rings inside the adjacent ends of the pipes to prevent the formation of icicles and to prevent weld-spatter during welding. To obtain a good weld spacer means have been affixed to the welding ring to properly space the pipe ends. Such metal backing rings are at least partially welded to the inside of the pipe at the joint and are allowed to remain in the resultant pipe as there is no effective way of removing them. The ring elements which remain are of significant size and even when designed to the best advantage are capable of hindering the flow of liquid in the pipe so that in designing equipment to handle a particular volume of fluid this hindrance to flow must be taken into consideration and a larger pipe than necessary according to calculations must be employed. Also, unless such rings are made of substantially identical metal with that of the pipe, the process of corrosion is accelerated adjacent the joint.

Among the objects of this invention is to provide an improved type of ceramic backing ring that can be readily fitted to such pipe sections, can be readily removed therefrom and has improved types of spacer elements.

Among the more successful welding processes employed for smaller pipes, up to about a foot in diameter, for example, have been the inert gas welding process and the submerged arc welding process.

In the inert gas welding technique the pipes to be welded are plugged close to the ends to be united and during the welding process inert gas (argon, for example) is forced into the space between the plugs. In this process the inert gas is expensive and the operation requires great skill. Even with a skilled operator it is often impossible to prevent the formation of icicles on the inside of the weld joint or to prevent the floating out of the weld material.

Among the objects of this invention is to provide a welding backing ring which reduces the amount of skill required to effect the weld and which eliminates all tendencies toward the formation of icicles and the floating out of the weld material.

In the submerged arc welding process, which is especially useful for mechanical or automatic welding devices, a grooved backing ring having a flux within the groove is inserted at the pipe ends to be welded. During the early part of the welding process the low melting flux melts and surrounds or submerges the inner side of the metal to be welded to protect it from the atmosphere. No backing material other than copper has been available for this welding process. Steel cannot be employed since the arc temperature is high enough to burn through steel. The improved rings of the present invention can be employed with the submerged arc welding techniques with much less skill required of the operator.

The objects of the invention are obtained by providing a ceramic backing ring including structure which enables the ring to be fitted accurately inside of the pipe ends to be welded. The ring helps to hold the pipe ends in place and provides an insulating backing for the weld arc thereby preventing the formation of icicles. The ring of the invention is made entirely of inorganic ceramic materials and is prefired so that the heat of the welding arc has no effect on it. The ring may be grooved to various depths to regulate the amount of internal reinforcement of the weld joint. Once the weld is effected the pipe is struck so as to shatter the ceramic ring and permit flushing out of the shattered pieces from the inside of the pipe.

Various structural features are included in the ring to provide for a tight fit of the ring within the pipes to be welded. Since relatively large tolerances are sometimes permitted, the rings cannot often be shaped to accurately fit in the pipes. Holes may be provided in the ring for the insertion of spring like elements which elastically extend beyond the periphery of the ring to provide an elastic fit. A small gap may be provided in the ring to permit the ring to be squeezed to a smaller diameter. Or, the ring may be formed with tapered ends and made of a composition which may be easily cut or shaved-off at the periphery when forced inside a pipe of slightly smaller internal diameter.

The invention both as to its organization and its method of operation together with additional objects and advantages thereof will best be understood from the following description of specific embodiment thereof when read in connection with the accompanying drawings in which:

Fig. 1 is a cross-sectional side view of two pipes containing one form of the backing ring of the invention.

Fig. 2 is a cross sectional view taken on line 2—2 of Fig. 1.

Fig. 3 is an enlarged detail view of a portion of Fig. 1.

Fig. 4 is an enlarged detail view similar to Fig. 3 but illustrating a modified form of the device.

Fig. 5 is a cross sectional view similar to Fig. 1 showing another modified form of the invention.

Fig. 6 is an end view of still another modified form of backing ring.

Fig. 7 is an end view of another modified form of backing ring.

Fig. 8 is a view taken along line 8—8 of Fig. 9 of another form of the invention as applied to two pipe ends.

Fig. 9 is a cross sectional view, the left hand side of which is taken along line 8—8 of Fig. 8 and the right hand side of which is taken along line 8a—8a of Fig. 8.

Fig. 10 is an enlarged detail view of the pin holding portions of Figs. 8 and 9.

In Figs 1–3 of the drawing, the pipes 10 and 11 are to be welded together. The pipe 10 has the beveled end 12 and the pipe 11 has the beveled end 13. The backing ring device 20 of this invention is shown inserted in the two pipes to protect the latter from the formation of icicles during welding and from weld spatter. The backing device 20 comprises the ceramic ring 21, the removable metal clip 22 and the spring fitting elements 23, 24, 25. The end of the ring 21 contains the openings 26, 27 and 28 adapted to hold the ends of spring elements 23, 24, 25. Spring element 23, for example, is shown as a more or less straight wire spring having ends 30, 31 which are bent inwardly at right angles; the spring is of greater length than the distance between two holes 26, 27 or 28 so that when the spring is bent and the ends thereof inserted in holes 26 and 27, the central portion of the spring 23 extends beyond the circumference of the ring 21. However, the springs 23, 24, 25 can be compressed to force the element 20 into pipe end 11. By frictionally engaging the inside of the pipe the springs 23, 24 and 25 act to hold the backing device 20 in position. A plurality of spring elements 23, 24 and 25 are employed so that when the springs are freed from the restraining means (openings 26—28), the said springs may be removed from the pipe. Springs 24 and 25 are constructed similarly to spring 23.

The metal clip 22 is shown as consisting of two legs 32, 33, flexibly connected together at 34 so as to fit tightly about the ring 20. The said clip is rectangular in cross-section and is adapted to extend above the inner ends 12 and 13 of pipes 10 and 11 so as to space the latter the distance required to obtain a full penetration of the welded joint.

In operation, the backing device of Figs. 1–3 on which the metal clip 22 is mounted is inserted in the end of a pipe 11 which is properly prepared for welding by having the end thereof beveled as shown at 13. The other pipe 10 is inserted over the other end of ring 21 so that the ends 12 and 13 of said pipe abut and are spaced by the legs 32 and 33 of metal clip 22. The ends 12 and 13 of the pipe are then tack welded at several points within the areas between legs 32 and 33 of metal clip 22. The clip 22 is then removed and the joint is then completed by welding in the known way. When the welding operation has been completed a sharp blow on the outside of the pipe shatters the ceramic ring 21 freeing the spring elements 23, 24, 25, etc., and the pipe is then flushed out to remove the shattered pieces. Since the ceramic rings 21 can be fitted to within a tolerance of a few thousandths of an inch the resultant pipe joint provides for substantially unobstructed flow of liquid therethrough.

In the modification shown in Fig. 4 the ring 41 contains an annular groove 42 which is adapted to receive the lower portion of leg 33' of the holding clip. The holding clip, therefore, performs the double function of spacing the pipe ends 12 and 13 and of holding the ring 41 in position. If desired the ends 43, 44 of the ring 41 may be made slightly conical to facilitate insertion of the said ring in the pipes.

In the modification shown in Fig. 5, the end portions 71, 72 of the ring 70 are tapered peripherally but include the cylindrical portions 73, 74 at the central region. The cylindrical portions 73, 74 are separated by a groove 75, which may contain a flux material 76. It will be noted that the cylindrical portion 74 has a slightly greater diameter than the cylindrical portion 73. In practice the larger ring end 72, 74 is first forced onto one of the pipe ends 11 to be welded. Thereafter, the pipe end 10 is forced onto the other end 71, 73. Since the diameter of portion 74 is larger than the diameter of portion 73 the step of forcing the second pipe end 10 onto the ring will not push the ring further into the pipe end 11. In this way it is possible to properly position the pipe ends on the ring 70 without requiring spacer means. The ring 70 is made of porous, shatterable, prefired ceramic material which may be easily shaved off by the internal edges of the pipes 10 and 11. In actual practice the diameter of cylindrical portion 73 is only a few thousandths of an inch larger than the internal diameter of pipe 10 and the cylindrical portion 74 is only a few thousandths of an inch larger in diameter than cylindrical portion 73.

As stated above the rings are made of a porous, shatterable and easily machined ceramic composition. Various methods are known for producing a molded and fired ceramic body with these characteristics. The ceramic material should also have high heat shock resistance so as not to crack or break during the welding process. Suitable compositions having the required heat shock resistance include cordierite compositions consisting largely of alumina, high heat-shock porcelains, quartz, silicon carbide compositions, certain heat shock resistant glasses. A very satisfactory material is a soft porous porcelain having high heat shock resistance. Porcelains can be fired at temperatures below the normal firing temperatures to produce a product which is softer and easier to machine.

Glass bonded compositions such as glass bonded mica and glass bonded asbestos also have high heat shock resistance and are relatively easy to machine.

Another very satisfactory material is made up of the following ingredients in the proportions indicated:

|  | Percent |
|---|---|
| Ball clay and/or kaolin | 10–50 |
| Calcined or fused alumina | 5–30 |
| Fused silica | 10–85 |

The alumina and fused silica should be in different mesh sizes the largest size being about minus 4 mesh, for example. Unless otherwise indicated all proportions set forth in the specification and claims are by weight. In the above formulation it is the fused silica which gives the body the desired heat shock resistance by imparting its extremely low coefficient of expansion to the body.

The arc shaped peripheral groove 45 of Fig. 5 is a very satisfactory shape of groove but other shapes may be employed and where additional flux is desired the groove may be made considerably deeper and filled with flux. Flux materials that may be employed include powders of sillimanite, wollastonite, fused alumina, fused magnesia, fused mullite, and mixtures of these materials. These powdered materials may be merely tamped into the groove 45.

Instead of dry powdered material, slip-like composites may be employed to coat the groove 45 of the ring to promote the production of an easily removed slag at the inner side of the weld. A wash coating consisting of around 90–95% of wollastonite and 5–10% of clay dispersed in water is a very satisfactory slip-like coating. Various mixtures of slags, clay and wollastonite, etc., may be employed for such a coating material. The clay acts as a dispersing and binding agent for such a coating composition.

The ring compositions as disclosed above are slightly flexible and elastic after firing and accordingly may be made with a gap therein as disclosed in Fig. 6. In this form of the invention the ring 50 has a gap 51 formed therein. When it is desired to insert the ring into the pipe ends the ring is pinched together, inserted in the pipe and allowed to expand to fit closely inside of the latter.

The modified structure shown in Fig. 7 may be included in any of the rings of the invention. According to this modification the ring 55 is provided with a number of indentations 56, 57, 58, 59 in its inner periphery which contribute to the shatterability of the ring.

Where accurate spacing is required, the spacing means of Figs. 1–2 may be employed with any one of the rings of Figs. 5–7. Figs. 8–10 show another type of spacing means which may be employed with any of the rings of the invention. In this form of the invention the ring 60 is formed with a number of radial holes 61 therein. Three such holes (approximately 120° apart) are sufficient. Keys 65 are provided. These keys 65 have a head 66 which may be winged as shown, a relatively large body section 67 which is flattened on opposite sides as shown at 68, 69 and a small end portion 70 adapted to fit into the holes 61 of ring 60. The spacer keys 65 are placed in the ring 60 before or after the pipe sections 10, 11 are in place on the ring and the ring is so turned that the larger curved sides of body portion 67 bears against the opposed side edges of the pipes. After the pipe ends have been tack welded, the shrinkage of the weld metal pulls the ends of the pipes tightly against keys 65 but said keys may be turned with flattened sides 68, 69 towards pipe ends and then be easily extracted before making the root weld. In place of the keys 65 a cotter pin means such as shown in U. S. Patent No. 2,448,107 may be employed.

The rings may be formed by extrusion or by molding or casting. Plaster of Paris may be employed to provide a very inexpensive casting mold. After the rings are formed they are fired in a suitable kiln.

The following examples further illustrate the process.

Example I

A zircon composition consisting of about 35–45% of clay, 7–15% of feldspar, 25–50% of zircon, 10–20% of mullite and 3–7% of grog is made by blunging the clay, dewatering the slip produced to obtain a soft mud and adding the other ingredients. The composition is then thoroughly mixed to provide a stiff mud.

A ring is formed into the shape similar to that shown in the ring 20 of Fig. 1 by extruding the resultant plastic composition. The shaped body is then vitrified at around Seger cone 13 or higher. The fired product is then ground to the tolerance required. The springs 23, 24 and 25 are inserted. These springs hold themselves in place due to their elasticity.

This product is then fitted with metal clip 22 and employed to weld two pipes as set forth above.

Example II

A cordorite composition consisting essentially of 30–45% clay, 20–30% talc, 3–7% spar, 27–37% of kyanite and 5–10% of sand is made up by thoroughly dewatering, mixing the ingredients with sufficient water to form a moldable mud in a suitable mixing device. The resultant composition is molded to ring form by extruding or by pressing and is then fired at the temperature of Seger cone 13 or higher.

Example III

A composition for forming a porous ring is made by mixing and grinding 40–50% of clay, 10–20% of calcined clay, 25–45% of alumina and 0–5% of spar together in a ball mill. A slip of the resulting composition is drain cast in a porous mold, the excess slip being poured out of the mold after the required ring thickness is built up by the dehydration of the slip adjacent the outside part of the porous mold. The resultant product is then fired at Seger cone 13 and is thereafter ground to the tolerance required and fitted with springs 23, 24 and 25.

Example IV

A molding composition is made by thoroughly mixing 14% of Kentucky ball clay, 24% of kaolin, 12% of calcined alumina and 50% of fused silica with sufficient water to provide a relatively soft mud. The fused silica has a size of minus 4 mesh or less. The mud is cast in a plaster of Paris mold to provide a ring as shown in Figs. 4–9. The cast ring is removed from the mold and fired at Seger cone 13, for example.

Most of the trouble in welding is caused by an improper first pass. If the first pass is not correctly manipulated, cracks in the root welds develop. The rings of this invention avoid this difficulty since it is possible to obtain 100% fusion and penetration without fear of run through. The ceramic rings have, of course, excellent heat insulating properties permitting reduction of the welding current and allowing for slower cooling thus preventing chill crocking. By varying the depth of the groove (45 of Fig. 5, for example) the reinforcement of the underside of the weld can be controlled from zero to any desired amount, since all other portions of the welding ring are eventually removed from the inside of the pipe. Where zero reinforcement is desired a small groove 45 may still be employed. For example, a groove about 1/32" deep and 1/4"–3/8" wide results in no internal reinforcement of the weld joint.

The porous, more or less soft ceramic compositions employed, eliminate the necessity for machining the inside of the pipe ends.

The time required to make the weld is considerably reduced. Tests have indicated that 5 to 10 pipe welds can be made with the ceramic rings of the invention while one weld is being made by the older methods.

Since the ceramic rings are refractory they do not interfere in any way with the welding process. For example, they contain no free carbon or loosely bound carbon capable of diffusing into the welding metal. The ceramic bodies also have low heat conductivity so that the heat applied at the abutting ends and to the welding rod is all concentrated for the welding operation. The rings fit closely enough to prevent any substantial deposits of welding metal from projecting inwardly at the joint but such rings also permit the full penetration of the welding metal in the joint. Since the ceramic ring is removed from the inside of the pipe one type of ring can be used for all pipes of the same size regardless of the composition of said pipes.

The features and principles underlying the invention described above in connection with specific exemplifications will suggest to those skilled in the art many other modifications thereof. It is accordingly desired that the appended claims shall not be limited to any specific feature or details thereof.

This application is a continuation-in-part of U. S. application Serial No. 305,615, filed August 21, 1952, and now abandoned.

I claim:

1. A liner device for use in the welding of two pipe ends together comprising, in combination, a ring of shatterable ceramic material adapted to fit within the pipe sections to be welded, a plurality of flexible elastic strip metal retaining means, each of said retaining means being of shorter length than the diameter of the ring, said ring including means at the end thereof adapted to hold the ends of said retaining means so that intermediate portions of the latter extend elastically beyond the circumference of said ring, a removable spacing clip having opposed elastically connected leg portions adapted to contact two opposite side portions of said ring so as to abut against opposite sides of the end edges of two pipes fitted on said ring to space apart the said end edges of said pipes.

2. A liner device for use in the welding of two pipe ends together comprising, in combination, a ring of shatterable ceramic material adapted to fit within the pipe sections to be welded, a plurality of flexible elastic strip metal retaining means, each of said retaining means being of shorter length than the diameter of the ring, said ring including means at the end thereof adapted to hold the ends of said retaining means so that intermediate portions of the latter extend elastically beyond the circumference of said ring, an intermediate portion of said ring containing a circumferential groove on the outside thereof, a removable spacing clip having opposed elastically connected leg portions adapted to contact two opposite side portions of the grooved region of said ring so as to abut against opposite sides of the end edges of two pipes fitted on said ring to space apart the said end edges of said pipes.

References Cited in the file of this patent

UNITED STATES PATENTS

| | | |
|---|---|---|
| 1,990,077 | Kershaw | Feb. 5, 1935 |
| 2,188,925 | Ronay | Feb. 6, 1940 |
| 2,623,148 | Ronay | Dec. 26, 1952 |